United States Patent Office 3,425,280
Patented Feb. 4, 1969

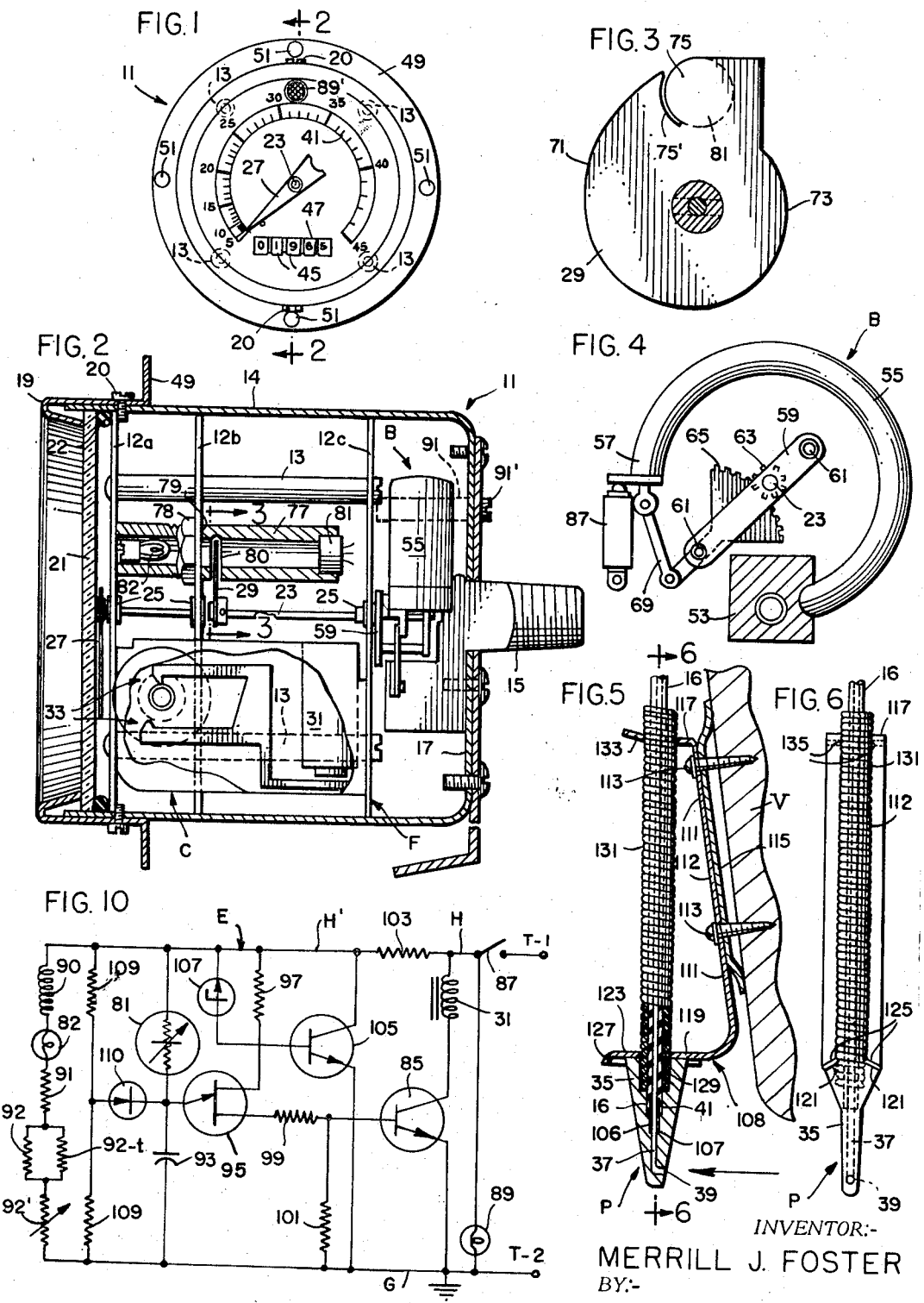

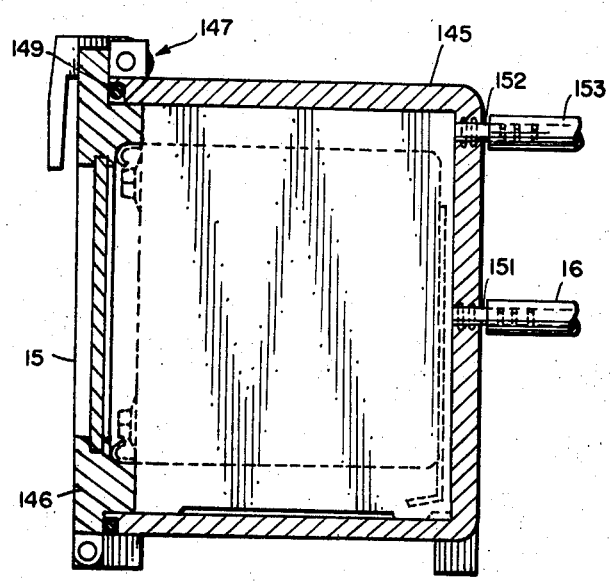
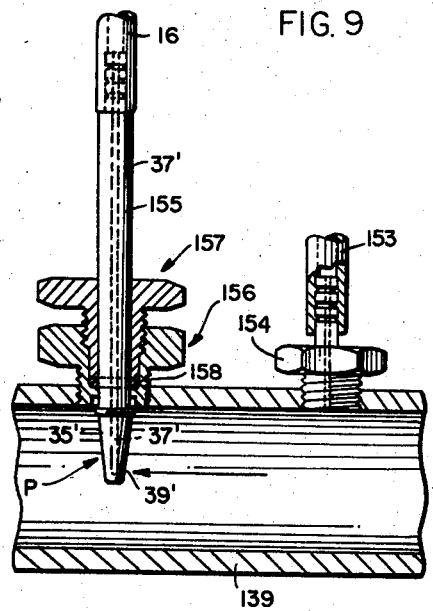
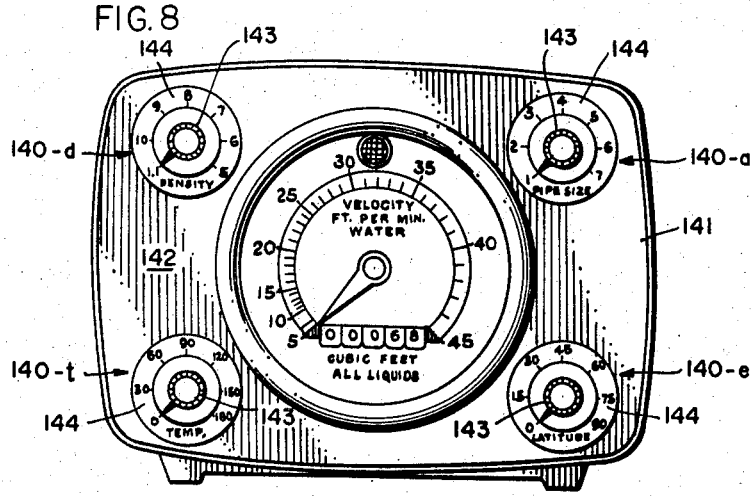

3,425,280
ELECTRONIC INSTRUMENT FOR MEASURING FLUID FLOW PAST FLUID PRESSURE SENSING MEANS
Merrill J. Foster, Fox River Grove, Ill., assignor to Marine Industries, Inc., Barrington, Ill., a corporation of Illinois
Continuation-in-part of application Ser. No. 479,185, Aug. 12, 1965. This application Sept. 13, 1966, Ser. No. 579,099
U.S. Cl. 73—212                                                  14 Claims
Int. Cl. G01f 1/04

ABSTRACT OF THE DISCLOSURE

An instrument for determining and indicating speed and distance traveled by a vessel, such as a boat, in a fluid medium, and an instrument for measuring velocity and volume of fluid flowing in a confined flow channel past a station, said instruments embodying a housing with velocity, and distance or volume indicating means driven by a Bourdon tube connected with a Pitot tube and associated electronic circuitry, including a photoconductive cell, a constant intensity light source and an interposed shutter actuated by the Bourdon tube to vary intensity of cell-impinging light, and an electronic counting system including a timing capacitor and a unijunction transistor to to varying resistance of the photoconductive cell, the actuate a mechanical counter at a frequency responsive counter having numbered indicia wheels indicating distance traveled by the vessel or volume of fluid which has flowed past the station.

---

The present invention is a continuation-in-part of a copending application Ser. No. 479,185 filed Aug. 12, 1965, now U.S. Patent No. 3,364,739, issued Jan. 23, 1968.

The present invention relates in general to the measurement of fluid flow, and has more particular reference to improved apparatus for measuring not only the velocity or speed of flow of fluid at a measuring station, but also the quantity or amount of fluid that passes the measuring station during a finite time interval; and, the present invention contemplates the provision of apparatus which may be applied, as at a fixed station to measure the velocity and volume of fluid flow passing the station, as through a conduit, pipe or channel, the apparatus being also adapted for mounting in a fluid borne vessel, such as a boat, to measure the rate at which the vessel moves through the fluid carrying medium, as well as the distance traveled by the vessel through the medium.

The present application discloses the invention of the aforementioned copending application for the measurement of speed and distance traveled by a vessel moving in a fluid medium, the present application, in addition to the disclosure of said copending application showing and claiming an adaptation of said apparatus for the measurement of velocity and volume of fluid traversing a flow channel.

An important object of the present invention is to provide a measuring instrument and system that may be applied for determining and indicating speed and distance traveled by a fluid borne vessel, such as a boat, ship or aircraft, and which also may be applied to measure the velocity and volume of fluid traversing a flow channel at a measuring station.

A further object of the invention is to provide an instrument embodying a unit adapted for quick and easy mounting in the vessel or craft on which it is to be used, when applied as a speed and distance measuring device.

A still further object of the invention is to proivde an instrument embodying a unit adapted for disposition in a fluid conduit for the measurement of velocity and volume of fluid flow in a conduit or channel.

Yet another object is to provide instruments of the character mentioned that are fully automatic, thoroughly reliable, unusually compact and well adapted for economic manufacture.

Another important object of the invention is to provide apparatus embodying a Pitot tube adapted to be mounted in position extending in the fluid the flow of which is to be determined, said tube, when the invention is applied as a speed and distance measuring instrument for use in fluid borne vessels, being arranged to extend in the vessel carrying fluid medium, and, when embodied as a device for measuring velocity and volume of fluid flow in a fluid flow channel, the Pitot tube is arranged to be mounted in the fluid flowing through the conduit or channel; the invention, in either case embodying a Bourdon tube, upon which pressures, developed by the Pitot tube in response to fluid flow past the same, are applied in order to indicate velocity in terms of Bourdon tube movement; a further object being to provide a transducer in association with the Bourdon tube and with electronic circuitry for integrating velocity and time, in terms of electrical pulsations, said circuitry serving to apply such pulsations for the actuation of counting mechanism to indicate distance traveled, where the apparatus is applied as a marine odometer, in a fluid borne vessel or vehicle, or to indicate the volume of fluid flow past the measuring station formed by the Pitot tube mounted in stationary position in the fluid flow channel.

Another important object, where the apparatus is embodied as a speedometer and odometer for use in boats, is to provide an improved foul proof Pitot tube mounting; a further object being to provide a novel spring urged Pitot tube mounting, normally supporting the tube in operative position and yielding to permit the tube to swing aside upon encounting an obstruction and thereafter to return to operative position promptly after passing the obstruction.

Another important object is to provide an improved and simplified mounting structure for supporting a Pitot tube in a fluid conduit or channel with an end of the tube immersed in the fluid flowing in the channel.

Another important object is to provide an improved velocity and volume indicator, embodying a Bourdon tube actuator enclosed in an hermetically sealed casing with a pressure connection from the housing enclosed Bourdon tube, to the externally disposed Pitot tube, and a pressure connection between the hermetic housing and the fluid flow conduit in which the Pitot tube is mounted, whereby to expose the Bourdon tube externally only to the pressure head to which the Pitot tube is exposed, while exposing the Bourdon tube internally only to the pressure head produced by the Pitot tube, so as to assure that the meter indicates the velocity head only.

The foregoing and numerous other important objects, advantages and inherent functions of the invention will become apparent as the same is more fully understood from the following description which, taken in conjunction with the accompanying drawings discloses preferred embodiments of the invention.

Referring to the drawings:

FIG. 1 is a face view of an indicating instrument embodying the present invention;

FIG. 2 is a sectional view taken through the intrument substantially along the line 2—2 in FIG. 1;

FIG. 3 is a sectional view taken substantially along the line 3—3, in FIG. 2;

FIG. 5 is an end view of a Bourdon tube component forming a part of the unit shown in FIGS. 1 and 2;

FIG. 5 is a sectional view through a Pitot tube and means for mounting the same on a fluid borne vessel, in position forming a fluid immersed measuring station for determining the speed and distance traveled by the vessel through the supporting fluid;

FIG. 6 is a sectional view taken substantially along the line 6—6 in FIG. 5;

FIG. 7 is a partially sectionalized side view of an hermetically sealable housing for containing measuring apparatus of the sort shown in FIGS. 1 and 2, when used to indicate the velocity and volume of fluid moving in a flow conduit or channel;

FIG. 8 is a sectional view taken substantially along the line 8—8, in FIG. 7;

FIG. 9 is a sectional view taken longitudinally through a pipe forming a fluid flow conduit or channel containing a Pitot tube mounted therein in accordance with the present invention; and FIG. 10 is a diagram of electrical components and circuitry forming a part of the measuring system.

To illustrate the invention, the drawings show apparatus 11 for measuring the flow of fluid passing an immersed Pitot tube P forming a measuring station. The apparatus is adapted for use as a flow meter in conjunction with a fluid flow channel, to determine the velocity and volume of fluid movement in the channel past the Pitot tube mounted therein. The apparatus is also adapted to function as a marine speedometer and odometer for measuring speed and distance traveled by a fluid borne vehicle, such as aircraft and boats. In either case, the apparatus of the present invention applies pressure, developed in a Pitot tube exposed to the action of the fluid medium, to actuate a Bourdon tube mechanism B, including a dial D calibrated to indicate the relative speed of fluid flow, with respect to the Pitot tube; and, the apparatus also includes an electronic system E for integrating the so-measured velocity with respect to time, to operate a conventional counter mechanism C calibrated to indicate either distance traveled by a vessel mounted Pitot tube, or volume of fluid flow past a Pitot tube mounted in fixed position in a flow channel or conduit.

To these ends, the measuring and indicating apparatus may be mounted on a frame F embodying front, medial and back panels 12a, 12b, and 12c supported in spaced parallel relation as by means of spacing members 13, and a housing 14 in and on which the frame and apparatus are enclosed and supported. The Bourdon tube mechanism B may have a nipple 15 for connecting the mechanism with the Pitot tube P, through a suitable pressure conduit 16. The Bourdon tube mechanism may also be supported on and behind the back panel 12c, within the housing 14. The housing 14 may comprise preferably a cylindrical, formed sheet metal shell open at one end, and closed at the other by a preferably integral wall 17, the housing being sized to snugly receive the peripheries of the panels 12a, 12b and 12c therein. To aid in retaining the structure in the housing, suitable fastening and retaining means, such as a bezel 19 secured to the housing, may be employed, the bezel being detachably secured to the housing, as by means of screws 20. The bezel may retain a transparent window pane 21 in front of the panel 13a, an O-ring 22 forming a spacing and sealing gasket being disposed between the marginal edges of the pane 21 and panel 13a, within the open end of the housing.

The Bourdon tube mechanism B may include a shaft 23 extending through the journaled in preferably nylon or Teflon bushings 25 secured in the frame plates, the shaft carrying a pointer 27 and a disc 29 respectively in position outwardly of the front plate 12a and immediately behind the medial plate 12b. The components of the electronic system E may also be supported in any suitable, preferred or convenient manner upon the frame panels, preferably the medial panel 12b, said medial panel being cut away to accommodate the counter mechanism C, which may extend between and be secured to the front and back panels 12a and 12c. The panels 12a and 12c may thus support the mechanism C, as well as a counter actuating solenoid 31 adapted to drive the counter mechanism through ratchet means 33 which serves to advance the counter mechanism each time the solenoid is energized.

The Pitot tube P is a well known device for measuring the velocity of fluid passing the tube in a direction facing into its open end. As shown in FIG. 5 of the drawings, the tube may be mounted in any convenient location, on a fluid borne vehicle in position extending in the fluid medium in which the vehicle is adapted to move. While FIGS. 5 and 6 of the drawings illustrate a form of Pitot tube particularly well suited for use in water, the same being shown in mounted position, as at the stern of a water borne boat or vessel V, it should be understood that, when the invention is applied for airborne use, the same will be used in conjunction with conventional Pitot tube structures designed for use in air. As shown in FIG. 5, however, the Pitot tube P may comprise a thin plate or blade 35 adapted to be secured upon the hull of the vessel V with its lower end depending in position to receive the impingement of water upon the leading edge of the blade when the boat is in motion, as indicated by the arrow in FIG. 3, the blade being formed with a channel or duct 37 having an end 39 opening upon the forward edge of the blade, at or near its lower end, and opening at the top of the blade in position for connection with the pressure conduit 16 which extends to and is connected with the connection nipple 15 of the pressure measuring device B. The conduit 16 may comprise a length of flexible plastic hose and, as shown, may be press fitted, at one end, in a socket 41 at the top of the blade 35, in communication with the duct 37.

The velocity of fluid passing the blade 35, which is a function of the speed of the vessel V in the carrying fluid, is measured by the Pitot tube in terms of dynamic fluid pressure applied upon the tube. This pressure, applied through the pipe or conduit 16 upon the pressure responsive device B, is measured in terms of movement of the shaft 23, from a zero position, proportional to pressure applied on the measuring device B, which in turn is a function of speed. Shaft movement may be shown by the pointer 27 on a graduated indicating scale 41 which may be applied to the panel 13a, behind the pointer, and graduated to show speed in any desired units, such as miles per hour, or knots.

The counter mechanism C may comprise conventional digit or numeral wheels 45; and, the mechanism is mounted in position presenting the wheels to view immediately behind and opposite a window opening 47 in the panel 13a. The housing 15 may also be provided with a peripheral flange 49 formed with spaced apart openings 51 therethrough to facilitate the mounting of the unit 11 in viewable position, as in an opening in the usual instrument panel of the craft in which the unit may be mounted for service.

The pressure measuring apparatus B, as shown more particularly in FIG. 4 of the drawings, may comprise a pressure chamber 53 mounted on and within the housing 14 and connected with the Pitot tube 35 through the nipple 15 and conduit 16. The pressure measuring apparatus also comprising a curved Bourdon tube 55 having a closed end 57 and an open end connected with the pressure chamber 53. As shown, the tube 55 has circular curvature and subtends about 270° or three quarters of a circle. As pressure increases in the chamber 53, the tube tends to straighten, that is to increase its radius of curvature, which causes its closed end 57 to move away from its opposite end, which is connected to the pressure chamber 53 and thus firmly supported on the case 14. The displacement of the closed end of the tube away from its open end is a function of pressure prevailing in the chamber 53.

The movement of the closed end 57 of the Bourdon tube, as pressure increases in the chamber 53, is applied to correspondingly turn the shaft 23 and the shaft supported pointer 27 and disc 29, to thereby visually indicate speed by means of the pointer 27 and the scale 41, when viewed through the window pane 21. The shaft 23, of course, is suitably journaled in the panel 12c, and may also extend through a bracket bar 59 fastened on and spaced outwardly of the panel, as by means of mounting pins 61 disposed at opposite ends of the bar 59. The shaft 25 may carry a driving pinion 63 fixed thereon adjacent the bracket bar 59. The pinion 63, as shown, may be drivingly connected with a gear segment 65 rockably supported on one of the pins 61, the segment having an actuating arm 67 drivingly connected with the closed end 57 of the Bourdon tube, as by means of a link 69. As a consequence, movement of the tube end 57 will cause the gear segment to turn on the pin 61 and drive the pinion 63 to rotate the shaft 25, thereby turning the pointer 27, to indicate speed on the dial 41, and, at the same time, also turning the disc 29 in unison with the pointer, so that the disc 29 is also displaced from a zero or datum position as a function of speed.

The present invention contemplates the provision of means operable in conjunction with the disc 29 for integrating speed with time, in order to determine and indicate the distance traveled by an instrument carrying vehicle through its supporting fluid medium, or, where the instrument is employed as a stationary flow meter in a fluid flow channel, to determine and indicate the volume of fluid flow. To this end, as shown more particularly in FIG. 3 of the drawings, the disc 29 may be provided with a spirally curved edge 71, extending around the shaft and subtending an angle of the order of 270°, that is to say, approximately ¾ of a circle, from maximum to minimum radius, the radius of the edge progressively increasing, from its end 73 of minimal radius, toward its opposite end 75 of maximum radius. The medial frame panel 12b has an opening formed therein adjacent and preferably vertically above the shaft 23, a sleeve 77 extending through and being secured in said opening, as by the clamping action of a nut 78 threaded on the sleeve, on one side of the panel 12b, and a peripheral shoulder 79 formed on the sleeve in position to engage the opposite or nut remote side of the panel. Outwardly of the shoulder 79, on the nut remote side of the panel 12b, the sleeve 77 may be formed with a transverse slot 80 to receive the disc 29 in position to close the sleeve between its opposite ends, when the disc portions 75 of maximum radius extend in the sleeve, and to progressively open or unblock the sleeve as the disc 29 is turned in the slot, the disc being entirely withdrawn from the sleeve when its portions 73 of minimum radius face the slot 80. A photocell 81 and a suitable source of light, such as a small lamp 82, may be mounted within the opposite ends of the sleeve 77 in position to direct a light beam toward the cell 81, under the control of the disc 29, the sleeve 77 serving to confine the beam and to concentrate the same upon the cell 81. When the disc 29 is in its normal, datum, or zero speed position, incidence of the light beam upon the cell will be prevented by the intervening imperforate portion 75 of the disc 29. However, as the disc 29 is progressively turned from its datum position, as the result of relative movement of the vehicle in which the instrument is mounted, through its carrying medium, progressively greater amounts of light will be applied to the photocell, as disc portions of progressively lesser radius are presented in the slot 80. As a consequence, the electrical resistance of the photocell will become progressively changed as a function of the speed of the vehicle in its carrying medium.

The marginal configuration of the disc 29 is determined by the requirement that the amount of light transmitted to the photocell must correspond with the basic speed-pressure formula, that is to say, the pressure developed by the Pitot tube, as the craft moves in its sustaining medium, is proportional to the square of the speed of the craft in the medium. The resistance of the photocell 81 is inversely proportional to the amount of light incident thereon, and, in order that the resistance of the cell may be held proportional to speed, it must at all times remain proportional to the reciprocal of the square root of pressure generated in the Pitot tube. Accordingly, the edge 71 of the disc is shaped to pass light through the sleeve 77 in amounts corresponding with such reciprocal value. The disc 29 also may be formed with a generally radial slit 75' curved in conformity with the peripheral shape of the cell 81, said slit serving to pass an appreciable quanta of light to the cell as it is initially uncovered, so as to make up for any lag in the initial response of the equipment.

In order to integrate speed with time and to control the actuation of the counter C in accordance therewith, the electronic circuitry E may comprise a pulse generator connected to energize the counter driving solenoid 31, the circuitry, as shown, comprising a transistor 85 having its emitter and collector connected in series with the solenoid coil 31 between a pair of line conductors G and H connected with a suitable source of electric power, as at terminals T–1 and T–2, a circuit controlling switch 87 being connected in the line conductor H adjacent the terminal T–1. The power source may and preferably does comprise a 12–15 volt storage battery, although other voltage values may, of course, be employed. The switch 87 preferably comprises a normally closed microswitch mounted in position to be engaged and held open by the closed end 57 of the Bourdon tube 55 when and so long as the same occupies its normal, datum or zero speed position, the switch being released for switch closing movement as soon as the closed end of the Bourdon tube moves away from its normal or zero speed position. in response to the development of pressure in the Pitot tube 35. As a consequence, the circuitry E will automatically become conditioned for operation as soon as the instrument carrying vessel V starts to move in its supporting fluid medium.

In addition to the solenoid coil 31 and the transistor 85, the circuitry E may include a tell-tale lamp 89 interconnected between the conductors G and H and disposed in the housing 15 behind a bullseye lens 89' mounted in the front panel 12a to indicate when the switch 87 is in closed position and show that the electronic system E is in operation. In order to supply electrical power at, precisely regulated potential, for the operation of the system E, voltage regulating means, comprising a resistor 103, a transistor 105 and a Zener diode 107, is interconnected between the conductors H and G, to maintain a voltage of desired value, such as ten volts, on a bus conductor H'. To this end, the resistor 103 is connected between the conductors H and H'. The emitter and collector of the transistor 105 are connected in series between the conductors G and H', through the Zener diode 107. This type of diode blocks current flow at voltages higher than that to be maintained on the conductor H'. Connected as shown, the arrangement will maintain a constant desired potent, such as ten volts, on the conductor H', with respect to the ground conductor G. The photocell actuating lamp, 82 is interconnected between the conductors G and H', in series with a compensator 90, a preferably adjustable resistor 91, a pair of parallel resistors 92, 92-t equal resistivity, one of which such as element 92 may be a thermistor exposed to ambient temperature in the housing 14, to adjust the apparatus to changing temperative conditions, and a trimming resistor 92'. The compensator 90 and resistors 91, 92, 92-t and 92' may conveniently be mounted within the housing 14, as on its rear end wall 17, or elsewhere, with a turnable adjusting screw 91' exposed outwardly of the wall.

The compensator 90 may comprise 12 turns of No. 40 fiber glass covered resistance wire, such as Nichrome wire for example, wrapped about a one-quarter inch diameter brass rod which may be threaded for attachment on the panel 13b. The brass rod supports the wire and forms a heat sink. The wire of the compensator has a resistance of the order of fifty ohms, which increase with temperature as the wire heats up, reaching equilibrium in about five minutes. Since the compensator is in series with the photocell exciter lamp 82, it will compensate for the retarder response of the system during a warm-up interval of the order of five minutes, and will also level the pulse rate of the counter when the system is in operation in hot sunshine.

The photocell 81 may be connected between the conductors G and H', in series with a timing condenser or capacitor 93. The circuitry may also include a unijunction transistor 95 having one of its bases connected with the conductor H', preferably through a resistor 97, the other base of the transistor 95 being connected with the base of the transistor 85, through a resistance element 99, the end of which is connected with the conductor G through a resistance element 101, the emitter of the transistor 95 being connected with the junction of the timing condenser 93 with the photocell 81. If desired, the resistor 97 may comprise a thermistor exposed to ambient temperature within the housing 14, in order to automatically adjust the system for changes in temperature. Either or both of the resistors 92 and 97 may comprise a transistor. Where both elements are thermistors exceedingly accurate compensation is obtained, but useful results are realized if only one thermistor is used.

In order to bring the potential applied on the timing condenser 93 promptly to an operative level as soon as the switch 87 is closed, despite the inherent delay imposed by the resistance of the photocell 81, a voltage divider comprising a pair of resistors 109, connected in series between the conductors G and H', and a diode rectifier 110 are provided, the diode 110 being connected between the interconnected ends of the voltage dividing resistors and the ground remote side of the condenser, to apply condenser charging voltage on the condenser instantly, upon closure of the switch 87.

The following circuit components and parameters have been found effective in the embodiment illustrated in FIG. 7:

```
Photocell 81 _____ Type G.E.: A–35.
Condenser 93 _____ 100 mfd.
Unijunction 95 _____ Type G.E.: 2N–2160.
Transistors 85 and 105 __ Type Fairchild: 2N–3643.
Counter C _____ Type G.C.: CE 40AN5015.
Compensator 90 _____ 50 ohms.
Resistor 91 _____ 330 ohms.
Resistors 92 and 92' _____ 100 ohms.
Resistor
   (or Thermistor) 97 ____ 560 ohms.
Resistor 99 _____ 560 ohms.
Resistor 101 _____ 330 ohms.
Resistor 103 _____ 100 ohms.
Diode 107 _____ Intl. Rect.: 1N–961.
Resistors 109 _____ 560 ohms.
Diode 110 _____ Intl. Rect.: 4D–1.
```

As the disc 29 moves to progressively apply greater amounts of light on the photoconductive element 81, in response to increase in speed, the resistance of the element 81 is correspondingly reduced, thereby permitting the timing condenser 93 to produce charging and discharging pulses at frequencies which increase proportionally with increased speed of fluid flow past the Pitot tube. The capacitor 93 thus regulates the resistance-capacitance time interval required to bring the voltage up to the level required to fire the unijunction transistor 95, the firing rate being thermally stabilized by the thermistor 97, if used. The pulses produced by the firing of the transistor 95 are amplified by the transistor 85, thereby allowing current to flow through the counter actuating solenoid 31, with the aid of the resistor 101. Pulse frequency is determined by the electrical resistance of the element 81, which permits the capacitor 93 repeatedly to become charged to a voltage level permitting it to discharge through the transistor 95 and into the switching transistor 85, thereby actuating the counter solenoid 31. As a consequence, the solenoid will be pulsatingly energized at a rate corresponding with the amount of light permitted to fall upon the photocell 81 by the plate 29 which in turn corresponds with the velocity of fluid flow at the Pitot tube. Thus the solenoid driven counter will indicate the distance traveled by the instrument carrying vessel in its supporting medium, when used as a speedometer and odometer; and will indicate velocity and volume of fluid flow in a flow channel, when used as a flow meter.

The Bourdon tube apparatus may be provided with a conventional zero setting screw which may be adjusted at the factory.

As shown in FIGS. 5 and 6 of the drawings, the present invention provides an improved mounting for supporting the Pitot tube 35 on a water borne vessel V. The blade 35 is preferably formed of a suitable rigid plastic material, such as nylon, and the conduit 16 may comprise artificial rubber or similar flexible hose material. If desired, a short tube 106 may be applied within the blade connected end of the hose and snugly fitted into a seat 107 formed at the upper end of the duct 37, where it joins the socket 41, in order to aid in making fluid tight the connection of the hose 16 with the blade 35. A bracket 108 may be provided for mounting the blade 35 and attached end of the hose 16 adjustably upon the hull of the vessel V, said bracket preferably comprising a strap of metal such as stainless steel having a medial portion 112 preferably formed with longitudinal slots 111 and secured in vertically adjustable position on the vessel, as at its rear end, by means of preferably nickel plated brass screws or other suitable fastening members 113 extending in the slots 111, spring means such as a preferably Phosphor bronze leaf spring 115 being interposed between the vessel and the bracket to support the same in vertically adjusted position on the fastening members 113. The opposite ends of the bracket strap are preferably bent from the medial portion 112 to provide extending horizontal lugs 117 and 119.

The upper end of the blade 35 against the underside of the lug 119 may be formed with a threaded enlargement 129 at the upper end of the hose socket 41, for receiving the lower end of a close wound helical spring 131 which sungly embraces the hose 16 through a distance of several inches from its blade connected end. The slot 123 is sufficiently wide to receive the spring enclosed end of the hose therein, at its junction with the blade. As a consequence, the blade may be seated on the underside of the lug, in front of its downwardly turned rear edge, merely by sliding the blade attached end of the hose enclosing spring into the slot through its open end. The hose enclosing spring extends to and upwardly of the top lug 117, which also is formed with a slot 133 opening at the outer end of the lug. The opposite sides of the slot, however, may be formed as blunt knife edges 135 spaced a distance appreciably less than the coil diameter of the spring. Accordingly, the spring enclosed hose may be secured in the upper lug by pressing the spring into the slot between the knife edges 133, under sufficient spring tension to hold the blade and hose suspended on and between the lugs of the bracket. The outer end of the lug 117 may be tilted upwardly to aid in holding the spring on the lug.

It will be seen from the foregoing that the Pitot tube P will be resiliently supported on the vessel V by means of the spring and may deflect to either side, or rearwardly, or forwardly, upon encountering an obstacle. Spring action will draw the blade back to operating position as soon as the blade shall have passed the deflecting obstacle.

In order to apply the apparatus of the present invention for the measurement of velocity and volume of fluid flowing in a conduit or channel, such as the pipe 139 it is merely necessary to provide for mounting the Pitot tube P in stationary position in the flow channel and for calibrating the apparatus so that the indicating dial and counter 41 and 45 will indicate fluid flow in feet per second and in cubic feet per minute or other desired flow gauging units. To this end, it is desirable to provide for adjusting the apparatus in accordance with variable conditions, which may prevail at the place where the apparatus is used as a flow meter, such variable conditions including the density of the fluid being metered, its temperature, the cross sectional area of the flow channel, and the geographical latitude at which the metering is performed. The apparatus may be adjusted to accommodate variations in such conditions by changing the value of resistance in series with the photocell activating lamp 82 to thus adjust the response of the photocell controlled frequency response of the condenser 93 and the consequent rate at which the counter is operated as a flow volume indicator. This may be accomplished by substituting, for the resistance 91, a separate variable resistor, or rheostat, 140–d, 140–t, 140–a, and 140–e, suitably sized to compensate for variations in the corresponding variable conditions of density, temperature, area and latitude, the rheostats being connected in series with the lamp 82.

To accommodate the rheostats, the metering apparatus 11 may be enclosed in a housing 141 of the sort shown in FIG. 8, preferably having an elongated generally rectangular front wall 142, said housing containing the apparatus 11 centered therein, with the indicating dial exposed to view preferably centrally of the front wall 142. The rheostats 140–a, 140–d, 140–e and 140–t are preferably mounted on the back of the wall 142, in the corners thereof in position with their adjusting shafts projecting at the front side of the wall through suitable holes therein. The projecting ends of the shafts may carry attached adjusting knobs 143 to permit adjustment of the rheostats from in front of the wall 142, and indicating pointers for showing rheostat adjustment on scales 144 on the front of the wall.

Where the equipment is employed to measure velocity and volume of fluid flow in a channel, at atmospheric pressure, the Pitot tube P may be mounted in stationary position, immersed in the liquid flow stream to be measured, by any suitable, convenient or preferred mounting means, and may be connected with the Bourdon tube component of the indicating mechanism, by means of the tube 16, as previously described. If, however, apparatus embodying the present invention is applied to measure the velocity and volume of fluid flowing in a closed pipe or conduit, under pressure, means may be provided for enclosing the indicating mechanism 11, including the pressure responsive device B, in an hermetically sealed enclosure or housing of the sort shown in FIG. 7, which may conveniently comprise a box-like component 145 having a front opening and sized to snugly receive indicating apparatus of the sort shown in FIGS. 1, 2 and 8 of the drawings, such apparatus being preferably anchored in the box with its indicating dial disposed in the front opening. A preferably hinged cover 146 may be provided on the box, in order to sealingly close the opening, suitable preferably manually operable compression latch means 147 being provided for clamping the cover in closed position, sealing gasket means, such as a continuous O-ring 149, being disposed in a peripheral groove formed in the box, around the opening, in position to be squeezed in the groove by the cover 146, when closed. The cover may be provided with a transparent window 150 revealing the indicating dial of the enclosed mechanism to view through the cover when closed. The hermetic housing may be provided with a sealed connection 151 therethrough permitting the externally mounted Pitot tube to be connected with the pressure nozzle 15 of the Bourdon tube; and, the housing may also be provided with a pressure connection nipple 152, so that its interior may be connected as by means of a suitable pipe 153 with the interior of the fluid flow conduit 139, as by means of a suitable connection fitting 154 mounted in a screw threaded opening therein. As a consequence, the indicating apparatus including the Bourdon tube will be subjected to the pressure head prevailing within the fluid flow conduit, so that the Bourdon tube component will be responsive only to the pressure of the velocity head applied thereto by the action of the connected Pitot tube.

In order to provide for mounting the Pitot tube in a flow channel or pipe, as shown in FIG. 9, it may be formed as a preferably cylindrical stem 155, having a tapered and transversely flattened end forming a blade 35' adapted for immersion in fluid flowing in the flow channel, the stem having a longitudinal duct 37' extending in and from its said end 35' to and opening axially at the opposite end of the stem, the duct also having a lateral opening 39' at the end of the blade. The stem 155 may be supported in a gland or fitting 156 adapted for mounting in a lateral opening in the flow pipe or channel 139. To this end, the gland may conveniently comprise an externally screw threaded sleeve adapted for removable screw threaded assembly in a lateral opening in the pipe, the stem 155 of the Pitot tube being sized to extend snugly through the gland forming sleeve and being sealingly secured therein, as by a pressure fitting which may comprise a collar member 157 turnably embracing the stem 155 and having threaded engagement in the gland forming sleeve, said pressure fitting forming a shoulder for compressing a seal gasket, such as an O-ring 158, in a seat formed in the gland, around the stem. The end of the stem 155, remote from the blade 35' may be formed for fluid connection with the conduit 16 through which the duct 37' of the Pitot tube is connected with the pressure responsive device B of the indicating apparatus 11.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An instrument for measuring fluid flow past a fluid pressure sensing means comprising indicating means responsive to frequency of electrical pulses and including a coil, electronic circuitry for actuating said actuating means comprising conductors in an electrical circuit, a photocell having a variable electrical resistance characteristic responsive to variable incident light quanta, a light-emitter lamp connected across said conductors for emitting light incident upon said photocell, actuating means for varying said incident light quanta as a proportional function of fluid pressure at said sensing means, said fluid pressure varying with said fluid flow, a capacitor connected in series with said photocell across said conductors, a unijunction transistor connected across said conductors through resistance elements, the emitter of said unijunction transistor being connected between said photocell and said capacitor, an amplifier transistor connected across said conductors with its collector and emitter in series with said coil, and said unijunction transistor being connected with said amplifier transistor for amplifying the capacitor-induced pulse signal from said unijunction transistor, whereby the pulse frequency of electrical discharge from said capacitor is a function of the electrical resistance of said photocell, and said coil of said indicating means is pulsed at the corresponding pulse frequency.

2. An instrument as claimed in claim 1 wherein said circuitry further includes a pair of voltage dividing resistors connected in series across said conductors, a diode being connected between said voltage dividing resistors and between said capacitor and said unijunction transistor to apply instantly charging voltage on the capacitor.

3. An instrument as claimed in claim 2 wherein said lamp is connected across said conductors in series with resistance means including a pair of resistors in parallel.

4. An instrument as claimed in claim 3 wherein one of said pair of resistors is a thermistor.

5. An instrument as claimed in claim 1 wherein said lamp is connected across said conductors in series with resistance means including a pair of resistors in parallel.

6. An instrument as claimed in claim 5 wherein one of said pair of resistors is a thermistor.

7. An instrument as claimed in claim 1 wherein said circuitry further includes a transistor having its emitter and collector connected across said conductors in series through a Zener diode to maintain a substantially constant voltage across said conductors.

8. An instrument as claimed in claim 1 wherein said fluid pressure sensing means is a Pitot tube, and said actuating means comprises a pressure responsive device displaceable from datum position in response to fluid pressure in said Pitot tube.

9. An instrument as claimed in claim 8 wherein the pressure responsive device comprises a Bourdon tube.

10. An instrument as claimed in claim 8 wherein the actuating means comprises a pressure responsive device displaceable from a datum position through a distance proportional to velocity of fluid flow at said station, relatively movable index and scale means drivingly connected with said responsive means and calibrated to indicate fluid flow velocity, and wherein said indicating means comprises a counter actuated by electrical pulses in said coil and calibrated to show distance traveled by said Pitot tube exposed in and moving through a fluid.

11. An instrument as claimed in claim 8 wherein the actuating means comprises a pressure responsive device displaceable from a datum position through a distance proportional to velocity of fluid flow at said station, relatively movable index and scale means drivingly connected with said responsive means and calibrated to indicate fluid flow velocity, and wherein said indicating means comprises a counter responsive to electric pulsations in said coil and calibrated to show volume of fluid flow past said Pitot tube, said Pitot tube being stationarily positioned in a fluid flow channel.

12. An instrument as claimed in claim 1 wherein the actuating means comprises a pressure responsive device displaceable from a datum position in proportion to pressures produced by fluid flow under a static pressure head past a measuring station in a flow channel, and means for enveloping said pressure responsive device in an atmosphere at a pressure equal to the static head pressure in the flow channel.

13. An instrument as claimed in claim 12 wherein the pressure responsive device is enclosed in an hermetically sealed housing and means connecting the housing with the flow channel.

14. An instrument as claimed in claim 1 and manually adjustable resistance means for adjusting the intensity of light emitted by said lamp upon said photocell to compensate for variable atmospheric and fluid conditions.

References Cited

UNITED STATES PATENTS

| | | | |
|---|---|---|---|
| 2,325,884 | 8/1943 | Schorn | 250—231 X |
| 2,358,571 | 9/1944 | Hall | 250—231 X |
| 2,447,863 | 8/1948 | Kent et al. | 250—231 X |
| 2,604,528 | 7/1952 | Obermaier | 250—231 X |
| 2,609,686 | 9/1952 | Peterson | 73—183 |
| 3,035,449 | 5/1962 | Hollmann | 73—490 |
| 3,253,153 | 5/1966 | Stoddard | 250—231 X |
| 3,046,792 | 7/1962 | Morgan | 73—490 |

RICHARD C. QUEISSER, *Primary Examiner.*

E. D. GILHOOLY, *Assistant Examiner.*

U.S. Cl. X.R.

73—185; 250—231